United States Patent
Teknos et al.

(10) Patent No.: US 10,056,072 B2
(45) Date of Patent: *Aug. 21, 2018

(54) SYSTEMS AND METHODS FOR ELECTRONIC SOUND ENHANCEMENT TUNING

(71) Applicant: Ford Global Technologies, LLC, Dearborn, MI (US)

(72) Inventors: Athanasios Teknos, Rochester Hills, MI (US); Chin Lim Vong, Livonia, MI (US); Michael Peter Mongeau, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,225

(22) Filed: Jun. 26, 2017

(65) Prior Publication Data

US 2017/0294183 A1    Oct. 12, 2017

Related U.S. Application Data

(63) Continuation of application No. 15/084,674, filed on Mar. 30, 2016, now Pat. No. 9,693,139.

(51) Int. Cl.
   *H04R 3/04* (2006.01)
   *G10K 15/02* (2006.01)
   *G10K 11/178* (2006.01)

(52) U.S. Cl.
   CPC ........... *G10K 15/02* (2013.01); *G10K 11/178* (2013.01); *G10K 11/1784* (2013.01); *G10K 11/1786* (2013.01); *H04R 2499/13* (2013.01)

(58) Field of Classification Search
   CPC ....... H04R 3/04; H04R 2499/13; G06F 3/165; G10H 1/08; G10H 2250/381
   See application file for complete search history.

(56) References Cited

U.S. PATENT DOCUMENTS

| | | |
|---|---|---|
| 6,356,185 B1 | 3/2002 | Plugge |
| 7,885,417 B2 | 2/2011 | Christoph |
| 7,979,147 B1 | 7/2011 | Dunn |
| 8,320,581 B2 | 11/2012 | Hera et al. |
| 8,559,655 B2 | 10/2013 | Mihelich et al. |

(Continued)

FOREIGN PATENT DOCUMENTS

EP    2884489 A1    6/2015

OTHER PUBLICATIONS

Takeshi Abe et al. *The First Ford Active Sound Quality Control Car Development (Lincoln Mks)*, 2012, (7 Pages).

(Continued)

*Primary Examiner* — Brenda C Bernardi
(74) *Attorney, Agent, or Firm* — James P. Muraff; Neal, Gerber & Eisenberg LLP

(57) ABSTRACT

Example systems and methods for electronic sound enhancement tuning are disclosed. An example disclosed method includes sampling, with a microphone, an audio profile of engine noises in a cabin of a vehicle. The example method also includes comparing the sampled audio profile to a model audio profile. Additionally, the example methods includes, when the sampled audio profile does not satisfy a similarity threshold, applying a convergence function to the sampled audio profile to generate a target audio profile, and iterating until the target audio profile satisfies a similarity threshold.

17 Claims, 4 Drawing Sheets

(56) References Cited

U.S. PATENT DOCUMENTS

| | | |
|---|---|---|
| 8,976,974 B2 | 3/2015 | Christoph et al. |
| 9,118,290 B2 | 8/2015 | Christoph |
| 2015/0124989 A1 | 5/2015 | Park |
| 2015/0170629 A1 | 6/2015 | Christoph |
| 2016/0144782 A1 | 5/2016 | Jo |

OTHER PUBLICATIONS

Search Report dated May 9, 2017 for GB Patent Application No. GB1704377.9 (3 pages).

SYSTEMS AND METHODS FOR ELECTRONIC SOUND ENHANCEMENT TUNING

CROSS-REFERENCE

This application is a continuation application of and claims priority to U.S. patent application Ser. No. 15/084,674, filed on Mar. 30, 2016. The contents of the prior application is hereby incorporated by reference in its entirety.

TECHNICAL FIELD

The present disclosure generally relates to vehicle sound systems and, more specifically, systems and methods for electronic sound enhancement tuning.

BACKGROUND

Electronic sound enhancement (ESE) is integrated into vehicles to compensate for a lack of engine and exhaust noise with the cabin. As sound proofing of the cabin is improved to block out wind and road noise, the engine noise is also blocked. However, the engine and exhaust noises give a driver a feeling of exhilaration. Sound boards are included in audio systems to simulate the engine and exhaust noises.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments of systems and methods for electronic sound enhancement tuning process are disclosed. An example disclosed method includes sampling, with a microphone, of an audio profile of engine noises in a cabin of a vehicle. The example method also includes comparing the sampled audio profile to a model audio profile. Additionally, the example methods includes, when the sampled audio profile does not satisfy a similarity threshold, applying a convergence function to the sampled audio profile to generate a calibrated audio profile for a target vehicle.

An example disclosed apparatus includes an audio capturer configured to sample, with a microphone, an audio profile of engine noises in a cabin of the vehicle. The example apparatus also includes an audio tuner configured to compare the sampled audio profile to a model audio profile, and when the sampled audio profile does not satisfy a similarity threshold, applying, with the processor, a convergence function to the sampled audio profile to generate a calibrated audio profile.

An example tangible computer readable medium includes instructions that, when executed, cause a machine to sample, with a microphone, an audio profile of engine noises in a cabin of a vehicle. The example instructions also cause the machine to compare the sampled audio profile to a model audio profile. Additionally, the example instructions also cause the machine to, when the sampled audio profile does not satisfy a similarity threshold, apply a convergence function to the sampled audio profile to generate a calibrated audio profile.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
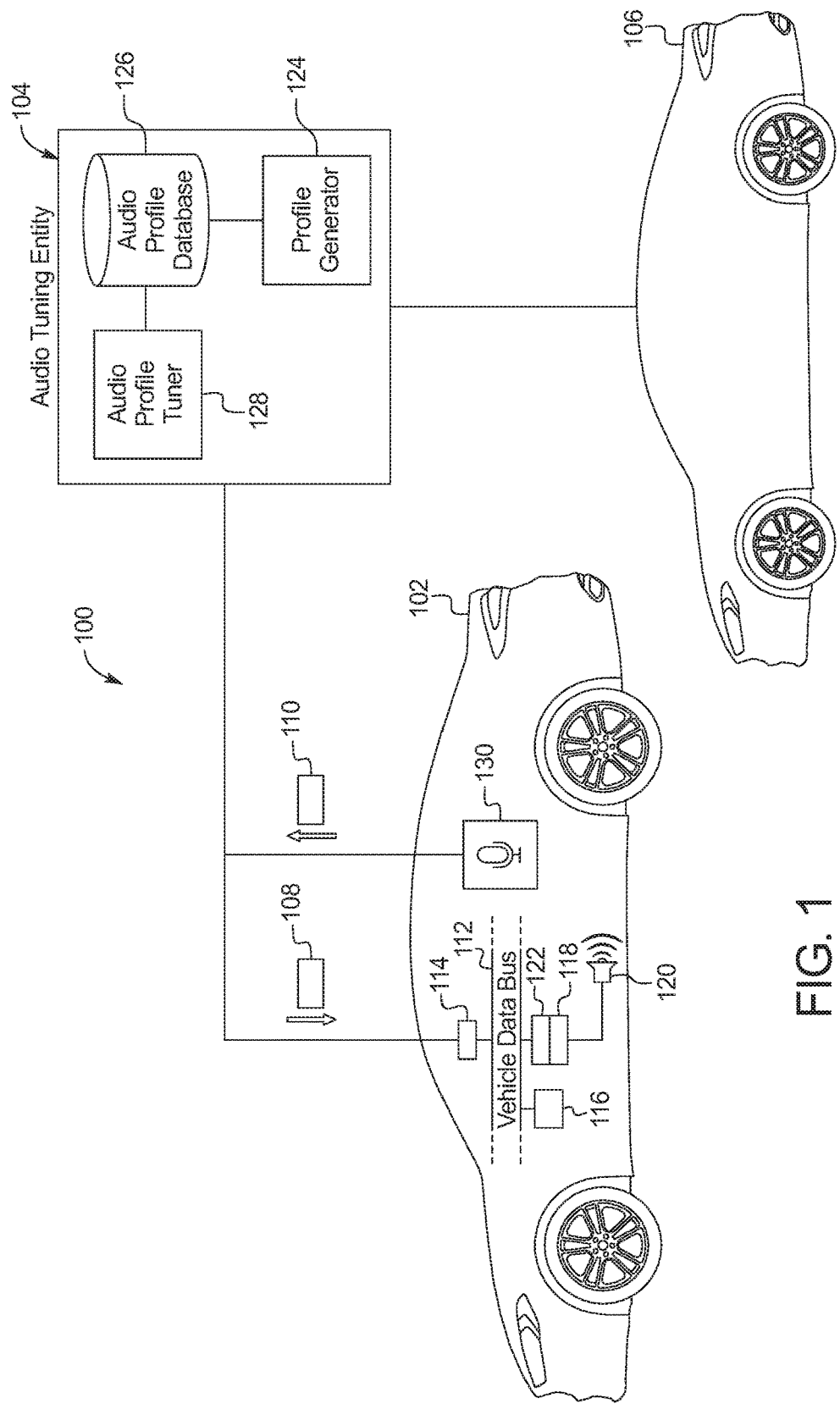
FIG. 1 illustrates an example system for electronic sound enhancement tuning in accordance with the teachings of the present disclosure.

While the invention may be embodied in various forms, there are shown in the drawings and will hereinafter be described, some exemplary and non-limiting embodiments, with the understanding that the present disclosure is to be considered an exemplification of the invention and is not intended to limit the invention to the specific embodiments illustrated.

Generally, drivers receive pleasure from engine and exhaust noises that result from their driving input. This is especially true for sportier vehicles (though the experience for non-sporty vehicles may also be enhanced). To compensate for the blocked engine and exhaust noise, a sound tuning entity (such as a vehicle manufacturer, a sound system manufacturer, or a vehicle custom part installer, etc.) generates an audio profile that is downloaded onto a sound board connected to the sound system of the vehicle.

The audio profile defines a waveform to be played by the sound system based on the revolutions per minute (RPM) of the engine, with the help of some ancillary engine parameters. The audio profiles are divided into RPM ranges (e.g., 0-50 RPM, 51-100 RPM, etc.) and corresponding frequency orders. As used herein, an order is a frequency that corresponds to a multiple of the RPM. For example, the first order is the RPM of the engine, and the second order is twice the RPM of the engine, etc. Often, the measured RPM is converted to revolutions per second as measure in Hertz (Hz) (one Hz equals sixty RPM). The waveform played by the sound system to simulate the engine noise is a composite of a selection of the orders and magnitudes (e.g. in decibel A-weighted) (dB(A))) corresponding to the orders as defined in the audio profile. Some of the selected orders are full orders. For example, if the RPM of the engine is 2100 RPM, the sound played by the sound system may include a 105 Hz frequency (the third order) at 15 dB(A), 140 Hz frequency (the fourth order) at 20 dB(A), and 175 Hz frequency (the fifth order) at 23 dB(A), etc. Some of the selected orders are half orders. For example, if the RPM of the engine is 2100 RPM, the sound played by the sound system may include a 88 Hz frequency (the 2.5 order) at 17 dB(A), a 123 Hz frequency (the 3.5 order) at 25 dB(A), and a 263 Hz frequency (the 7.5 order) at 26 dB(A), etc.

As disclosed herein below, the audio tuning entity generates calibrated audio profiles for the tuning vehicle (sometimes referred to as the "target vehicle") based on a model audio profile. The model audio profile may be sampled from a vehicle with a desired sound (e.g., one model audio profile for variants of the Ford® GT, another model audio profile for variants of Ford® Mustang, etc.) or synthesized in the lab to create a desired engine tone. The audio tuning entity generates an initial audio calibration file for the target vehicle and downloads that file into the target vehicle. The audio tuning entity measures the resultant audio profile produced by the calibration and compares to the model audio profile. The audio tuning entity applies a convergence function based on the differences to generate a new calibrated audio profile. The audio tuning entity downloads the modified audio profile to the target vehicle and recaptures the audio profile of the target vehicle. This process repeats until the audio profile of the target vehicle satisfies a similarity threshold when compared to the model audio profile.

FIG. 1 illustrates an example system 100 for electronic sound enhancement tuning in accordance with the teachings of the present disclosure. The system 100 of FIG. 1 includes a target vehicle 102, an audio tuning entity 104 and a model vehicle 106. The system 100 tunes a target audio profile 108 of the target vehicle 102 based on a model audio profile and a captured audio profile 110 of the target vehicle 102.

The target vehicle 102 may be a standard gasoline powered vehicle, a hybrid vehicle, an electric vehicle, a fuel cell vehicle, or any other type of vehicle. The target vehicle 102 may be non-autonomous, semi-autonomous, or autonomous. The target vehicle 102 includes parts related to mobility, such as a powertrain with an engine, a transmission, a suspension, a driveshaft, and/or wheels, etc. In the illustrated example, the target vehicle 102 includes a vehicle data bus 112, vehicle data bus port 114, an engine control unit 116, a sound system 118, speakers 120, and an ESE sound board 122.

The vehicle data bus 112 communicatively couples sensors (e.g., the engine control unit 116, etc.), electronic control units, and subsystems (e.g., the sound system 118, the ESE sound board 122, etc.). In the illustrated example, the vehicle data bus 112 facilitates the engine control unit 116 communicating with the sound system 118 and/or the ESE sound board 122. In some examples, the vehicle data bus 112 is a controller area network (CAN) bus protocol as defined by International Standards Organization (ISO) 11898-1. Alternately, in some examples, the vehicle data bus 112 may be a Media Oriented Systems Transport (MOST) bus, an Ethernet bus, or a controller area network flexible data (CAN-FD) bus (as defined by ISO 11898-7). The vehicle data bus 112 is communicatively coupled to the vehicle data bus port 114. In some example, the vehicle data bus port 114 facilitates the audio tuning entity 104 downloading (sometimes referred to as "flashing") the target audio profile 108 to the ESE sound board 122. In some additional examples, the vehicle data bus port 114 is an on-board diagnostics (OBD) port.

The engine control unit 116 controls the operation (e.g., valve timing, fuel injection timing, etc.) of an engine of the target vehicle 102. A tachometer in the engine control unit 116 measures rotations per minute (RPM) of a crankshaft of the engine of the target vehicle 102. The engine control unit 116 communicates the RPM of the engine via the vehicle data bus 112.

The sound system 118 is couple to the speakers 120. The sound system 118, as part of an infotainment head unit, receives inputs from different sources (e.g., a radio tuner, a mobile device communicatively coupled to the infotainment head unit, applications, etc.) and generates a signal to generate play on the speakers 120. The ESE sound board 122 is communicatively coupled to the sound system 118. In some examples, the ESE sound board 122 is integrated into the sound system 118. The ESE sound board 122 stores the target audio profile 108 for the target vehicle 102. The ESE sound board 122 monitors the RPM of the engine received from the engine control unit 116 via the vehicle data bus 112. Based on the RPM of the engine (and other desired engine parameters) and the target audio profile 108, the ESE sound board 122 generates a signal to be played by the sound system 118 over the speakers 120. When the target audio profile 108 is generated by the audio tuning entity 104, the target audio profile 108 is downloaded to the ESE sound board 122 via the vehicle data bus 112.

The audio tuning entity 104 is any suitable entity that tunes electronic sound enhancement (ESE) profiles of vehicles (e.g., the target vehicle 102), such as a vehicle manufacturer, a sound system manufacturer, or a vehicle custom part installer, etc. The audio tuning entity 104 generates the target audio calibration profile 108 based on the model audio profile for the target vehicle 102 and the captured audio profile(s) 110 from the target vehicle 102. The audio tuning entity 104 iteratively tunes the target audio profile 108 until the target audio profile 108 and the model audio profile are substantially similar (as defined in connection with FIG. 2 below). In the illustrated example, the audio tuning entity includes a profile generator 124, an audio profile database 126, and an audio profile tuner 128.

The profile generator 124 generates the calibration profiles. In general, a vehicle has a manufacturer (e.g., Ford, Toyota, BMW, Kia, etc.), a model (e.g., Mustang, FR-S, i8, GT4, etc.), and a variant (e.g., Mustang V6, Mustang EcoBoost, Mustang GT, etc.). Variants of the same model may have different engine sizes (e.g., a six cylinder engine, an eight cylinder engine, etc.), different cabin sizes and/or configurations, and/or different wheel bases, etc. These differences contribute to different unmodified audio profiles of vehicles of the same model. In some examples, the profile generator 124 bases the model profile for the target vehicle 102 is based on an audio profile captured from a model vehicle 106. In such some examples, the model vehicle 106 is a variant of the target vehicle 102. In such a manner, the engine and exhaust audio experience may be the same or similar for variants of the same model of vehicle. When the model vehicle 106 is used, an audio capturing device (e.g., a microphone) is placed in the cabin of the model vehicle 106 while the model vehicle 106 is driven so that the audio capturing device captures audio in the cabin from the engine and exhaust cycling through the range of RPM (e.g., from 0 RPM to 7000 RPM) of the engine (sometimes referred to herein as a "session"). Multiple sessions may be recorded and averaged to produce the model audio profile.

Alternatively or additionally, in some examples, the model profile is created and/or modified through audio engineering. For example, audio levels at some frequency orders may be modified (e.g., the power (dB(A)) of the frequency order is increased or decreased) to enhance the driving experience of the vehicle. For example, a certain set of frequency orders may be associated with producing a heightened driver level of satisfaction when the vehicle accelerates. Once created, the profile generator 124 stores the model profiles in the audio profile database 126. The audio profile database 126 may contain model profiles associated with different target vehicles 102 based on manufacturer, model and/or variant.

As disclosed in more detail in connection with FIG. 2 below, the audio profile tuner 128 generates the target audio profile 108 for the target vehicle 102. The audio profile tuner 128 is communicatively coupled with an audio capture device 130 (e.g., a microphone) located in the cabin of the target vehicle. In some examples, the audio capture device 130 is positioned to be where the driver would perceive the audio signal (e.g., produced by the engine, the exhaust, and the ESE sound board 122). The audio captured by the audio capture device 130 includes the actual engine and exhaust noise of the target vehicle 102 (which may be partially muffled because of cabin sound dampening to decrease road noise) and sounds played by the sound system 118 that are generated by the ESE sound board 122. Because the audio is affected by reverberation and absorption of the sound waves, the location of the speakers 120, and/or the path of the sound waves to the audio capture device 130, etc., a target audio profile 108 generated for one model variant may not have the same qualities when it is used in another model variant. The audio capture device 130 records one or more sessions. In some examples, the target vehicle 102 is driven on dynamometers when the audio capture device 130 records the session(s). Alternatively, the target vehicle is driven on a track when the audio capture device 130 records the session(s). The captured audio profile 110 may contain two or more of the sessions to be averaged by the audio profile tuner 128.

The audio profile tuner 128 processes the captured audio profile 110 and compares it to one of the model audio profiles stored in the audio profile database 126. The audio profile tuner 128 determines whether the processed captured audio profile 110 is substantially similar (as described in connection with FIG. 2 below) to the model audio profile. If the processed captured audio profile 110 is not substantially similar, the audio profile tuner 128 applies a convergence function to the processed captured audio profile 110 to increase the similarity between the processed captured audio profile 110 and the model audio profile. In such a manner, the audio profile tuner 128 generates the target audio profile 108. The audio profile tuner 128 downloads the target audio profile 108 to the ESE sound board 122 of the target vehicle 102. The audio profile tuner 128 iterates this process (e.g., recording the captured audio profile 110 and generating the target audio profile 108) until the processed captured audio profile 110 is substantially similar to the model audio profile.

Figure 2:
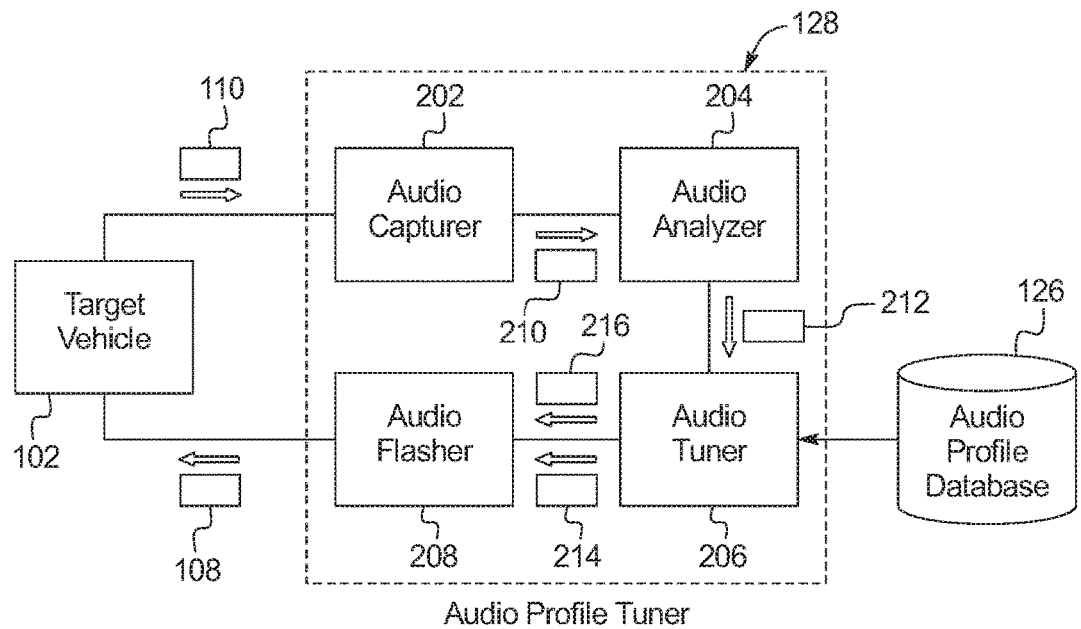
FIG. 2 is a block diagram of the audio profile tuner of FIG. 1.

FIG. 2 is a block diagram of the audio profile tuner 128 of FIG. 1. The audio profile tuner 128 generates a finalized target audio profile 108 based on a model audio profile stored in the audio profile database 126 and captured audio profiles 110 of the target vehicle 102. In the illustrated example, the audio profile tuner 128 includes an audio capturer 202, an audio analyzer 204, an audio tuner 206, and an audio flasher 208.

The audio capturer 202 receives and/or otherwise retrieves that captured audio profile 108 from the audio capture device 130 in the target vehicle 102. In some examples, when the captured audio profile 108 includes more than one captured session, the audio capturer 202 combines the audio from the sessions together to generate a combined captured audio profile 210. In some examples, to combine the sessions together, the audio capturer 202 averages the audio of the sessions. Alternatively, in some examples, the audio capturer 202 selects the minimum values between the sessions or the maximum values between the sessions.

The audio analyzer 204 receives or otherwise retrieves the combined captured audio profile 210 from the audio capturer 202. The audio analyzer 204 converts the combined captured audio profile 210 into the frequency domain. The audio analyzer 204 separates the combined captured audio profile 210 into RPM ranges and orders. For example, the audio analyzer 204 may separate the combined captured audio profile 210 into orders (e.g., the 2.5 order, the 3 order, the 3.5 order, etc.). In such an example, the audio analyzer 204 also may separate the combined captured audio profile 210 into RPM ranges that span 40 RPM from 600 RPM to 7000 RPM (e.g., 600 RPM, 640 RPM, 680 RPM, etc.) so that each order has defined RPM ranges. The audio analyzer 204 determines the power (e.g., in dB(A)) of the combined captured audio profile 210 for the orders at each of the RPM ranges. For example, the 3.5 order at 1840 RPM may have a power of −51 dB(A). In some examples, the audio analyzer 204 may include Artemis™ Suite developed by HEAD Acoustics GmbH. The audio analyzer 204 compiles the RPM-order-power information into an analyzed audio profile 212.

The audio tuner 206 receives or otherwise retrieves the analyzed audio profile 212 from the audio analyzer 204. The audio tuner 206 also retrieves the model audio profile from the audio profile database 126. The audio tuner 206 compares the analyzed audio profile 212 and the model audio profile. To compare analyzed audio profile 212 and the model audio profile, the audio tuner 206 determines the differences between the power at each order and RPM of the analyzed audio profile 212 to the corresponding order and RPM of the model audio profile.

To determine whether the analyzed audio profile 212 and the model audio profile are substantially similar, the audio tuner 206 defines a tolerance value and a similarity threshold. The tolerance value is a power level (in dB(A)) that specifies an absolute difference between the RPM-order pairs of the analyzed audio profile 212 and the model audio profile for the audio tuner 206 to consider the RPM-order pair to be a match. For example, if the tolerance value is 3 dB(A), the 1800 RPM-3.5 order power value for the analyzed audio profile 212 is −32 dB(A), and the 1800 RPM-3.5 order power value for the model audio profile is −34 dB(A), the 1800 RPM-3.5 order pair is considered to match. The similarity threshold specifies a percentage of the RPM-order pairs in a frequency order that are to match for the audio tuner 206 to determine that the order in the analyzed audio profile 212 matches the corresponding order in the model audio profile. For example, if the similarity threshold is 80%, and 82% of the power levels of the 3.5 order of the analyzed audio profile 212 are within the tolerance threshold, the audio tuner 206 determines that the 3.5 order of the analyzed audio profile 212 matches the 3.5 order of the model audio profile. The audio tuner 206 determines that the analyzed audio profile 212 is substantially similar to the model audio profile when all the orders of the analyzed audio profile 212 satisfy the similarity threshold. If the analyzed audio profile 212 is substantially similar to the model audio profile, the audio tuner 206 does not apply the convergence function. Rather, the audio tuner 206 generates a finalized audio profile 214 without changing the analyzed audio profile 212.

For orders in the analyzed audio profile 212 that do not satisfy the similarity threshold, the audio tuner 206 applies a convergence function to the RPM-order pairs of the analyzed audio profile 212. The convergence function generates a value to modify the power level of the RPM-order pairs of the analyzed audio profile 212 based on the difference between the RPM-order pairs of the analyzed audio profile 212 and the corresponding RPM-order pairs of the model audio profile. For example, if the 1800 RPM-3.5 order power value for the analyzed audio profile 212 is −27 dB(A), and the 1800 RPM-3.5 order power value for the model audio profile is −34 dB(A), the convergence function generates the value to apply to the 1800 RPM-3.5 order power value for the analyzed audio profile 212 based on −7 (−34 dB(A)--27 dB(A)).

Figure 3:
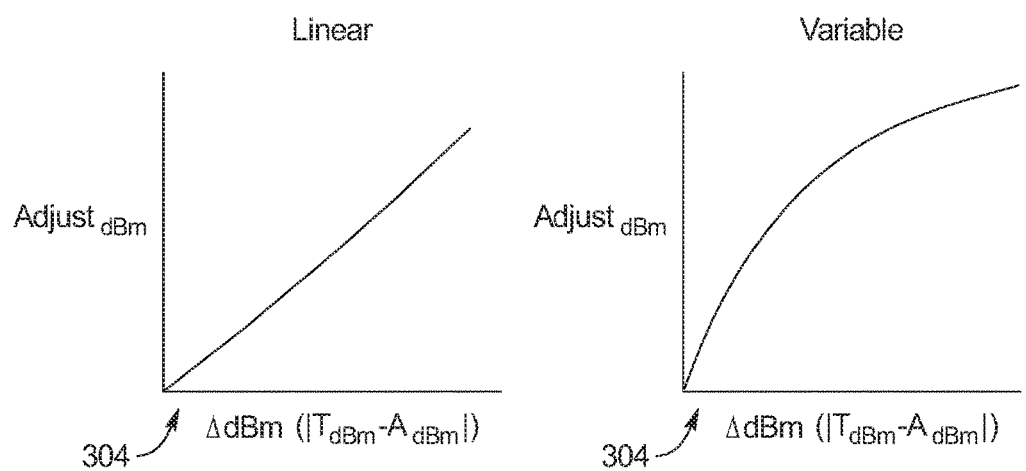
FIG. 3 depicts graphs of example convergence functions used by the audio profile tuner of FIGS. 1 and 2.

FIG. 3 depicts graphs of example convergence functions 302 and 304. A linear convergence function 302 generates a value equal to the difference between the power level of the RPM-order pair of the analyzed audio profile 212 ($A_{dB(A)}$) and the corresponding power level of the RPM-order pair of the model audio profile ($T_{dB(A)}$). For example, if the difference between the 1800 RPM-3.5 order power value for the analyzed audio profile 212 and the 1800 RPM-3.5 order power value for the model audio profile is −7 dB(A), the linear convergence function 302 generates a value of −7 dB(A) to add to the 1800 RPM-3.5 order power value of the analyzed audio profile 212. A variable convergence function 304 generates a value that depends on the absolute value the difference between the power levels of the RPM-order pair of the analyzed audio profile 212 ($A_{dB(A)}$) and the corresponding power level of the RPM-order pair of the model audio profile ($T_{dB(A)}$). The variable convergence function 304 is a non-linear approach that in some cases generates a greater value than the measured delta, and in other cases applies a smaller value than the measured delta. For example, if the difference between the 1800 RPM-3.5 order power value for the analyzed audio profile 212 and the 1800 RPM-3.5 order power value for the model audio profile is −7 dB(A), the variable convergence function 304 may generate a value of −5 dB(A) to add to the 1800 RPM-3.5 order power value of the analyzed audio profile 212. As another example, if the difference between the 1800 RPM-3.5 order power value for the analyzed audio profile 212 and the 1800 RPM-3.5 order power value for the model audio profile is −15 dB(A), the variable convergence function 304 may generate a value of −20 dB(A) to add to the 1800 RPM-3.5 order power value of the analyzed audio profile 212. The actual slope and shape of the variable convergence function 304 can be determined by the user and is most effective when based on the tolerance set for the target vehicle 102. For example, it can be beneficial to have an output adjustment dB(A) to be less than or equal to the measured dB(A) when the measured dB(A) is within a reasonable measure (eg. ≤1.5 times the value) of the tolerance, and an output greater than the measured dB(A) when the measured dB(A) is greater than a reasonable measure (eg. >1.5 times the value) from the target vehicle tolerance. Returning to FIG. 2, audio tuner 206 generates a converged audio profile 216 by applying the convergence function to the power values of the orders in the analyzed audio profile 212 that do not satisfy the similarity threshold.

The audio flasher 208 receives or otherwise retrieves the finalized audio profile 214 or the converged audio profile 216 from the audio tuner 206. The audio flasher 208 converts the finalized audio profile 214 or the converged audio profile 216 into the target audio profile 108. The conversion changes the finalized audio profile 214 or the converged audio profile 216 into a format to be downloaded into the ESE sound board 122 of the target vehicle 102. In some examples, the audio flasher 208 is communicatively coupled to the vehicle (e.g., via the vehicle data bus port 114) to download the target audio profile 108 into the ESE sound board 122.

Figure 4:
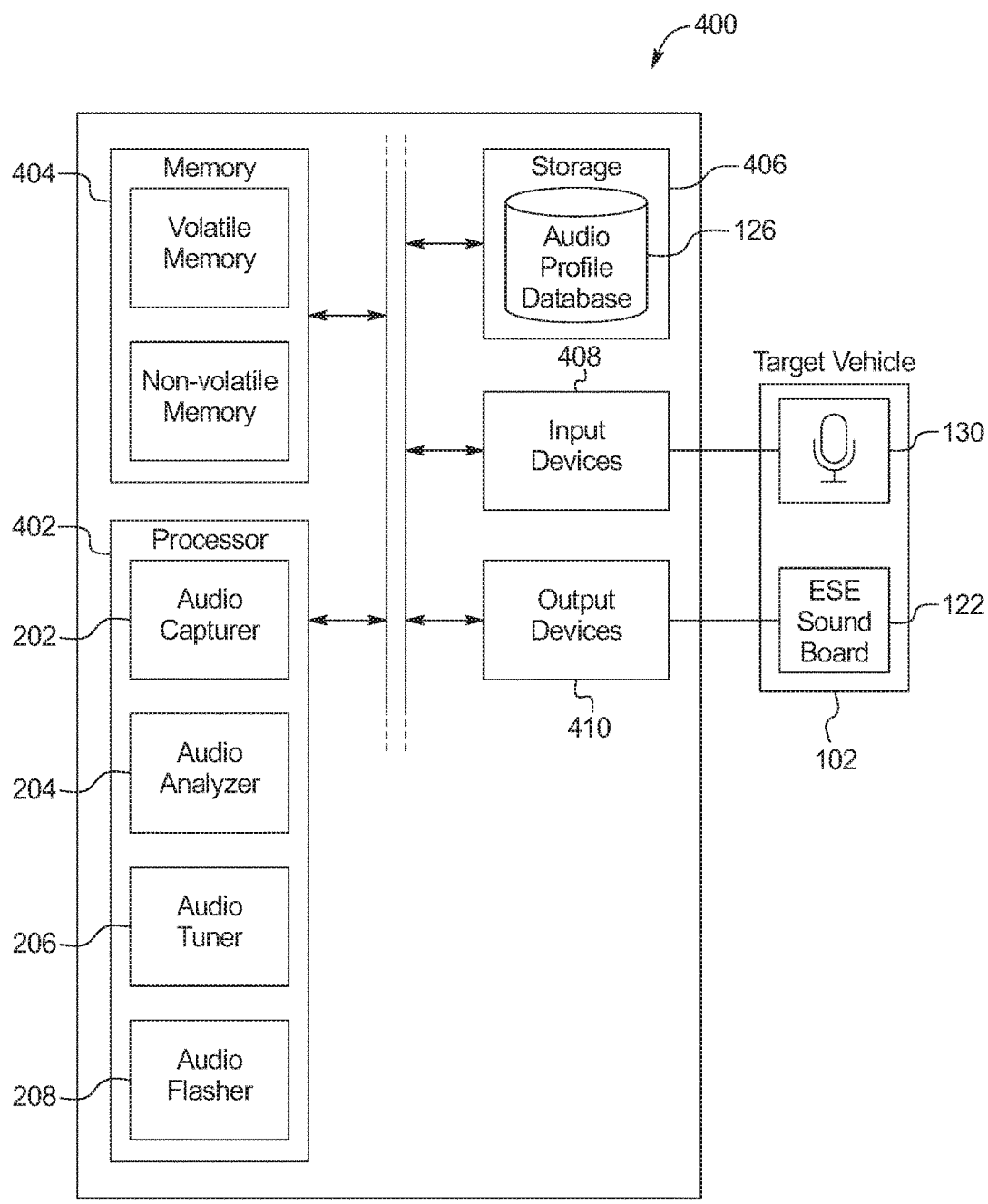
FIG. 4 illustrates electronic components used to implement the audio profile tuner of FIGS. 1 and 2.

FIG. 4 illustrates electronic components 400 that may be used to implement the audio profile tuner 128 of FIGS. 1 and 2. In the illustrated example, the electronic components 400 include a processor or controller 402, memory 404, storage 406, input devices 408, output devices 410, and a data bus 412.

The processor or controller 402 may be any suitable processing device or set of processing devices such as, but not limited to: a microprocessor, a microcontroller-based platform, a suitable integrated circuit, or one or more application-specific integrated circuits (ASICs). In the illustrated example, the processor or controller 402 is structured to include the audio capturer 202, the audio analyzer 204, the audio tuner 206, and the audio flasher 208. The memory 404 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 404 includes multiple kinds of memory, particularly volatile memory and non-volatile memory. The storage 406 may include any high-capacity storage device, such as a hard drive, and/or a solid state drive. In the illustrated example, the audio profile database 126 is stored in the storage 406.

The memory 404 and the storage 406 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 404, the computer readable medium, and/or within the processor 402 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor, or that cause a system to perform any one or more of the methods or operations disclosed herein. As used herein, the term "computer readable medium" is expressly defined to include any type of computer readable storage device and/or storage disk and to exclude propagating signals.

The input device(s) 408 facilitate a user interacting with the electronic components 400. Additionally, one or more of the input devices 408 are communicatively coupled to the audio capture device 130 in the target vehicle 102. The input device(s) 408 can be implemented by, for example, a serial port, a Universal Serial Bus (USB) port, a IEEE 1339 port, a keyboard, a button, a mouse, a touchscreen, a track-pad, and/or a voice recognition system.

The output device(s) 410 facilitate the electronic components 400 providing information to the user. Additionally, one or more of the output devices 410 are communicatively coupled to the ESE sound board 122 of the target vehicle 102. The output devices 410 can be implemented, for example, by display devices (e.g., a light emitting diode (LED), an organic light emitting diode (OLED), a liquid crystal display, a cathode ray tube display (CRT), a touchscreen, etc.), and/or communication devices (the serial port, the USB port, the IEEE 1339 port, etc.).

The data bus 412 communicatively couples the processor 402, the memory 404, the storage 406, the input devices 408, and the output devices 410. The data bus 412 may be implemented by one or more interface standards, such as an Ethernet interface, a USB interface, PCI express interface, and/or a Serial ATA interface, etc.

Figure 5:
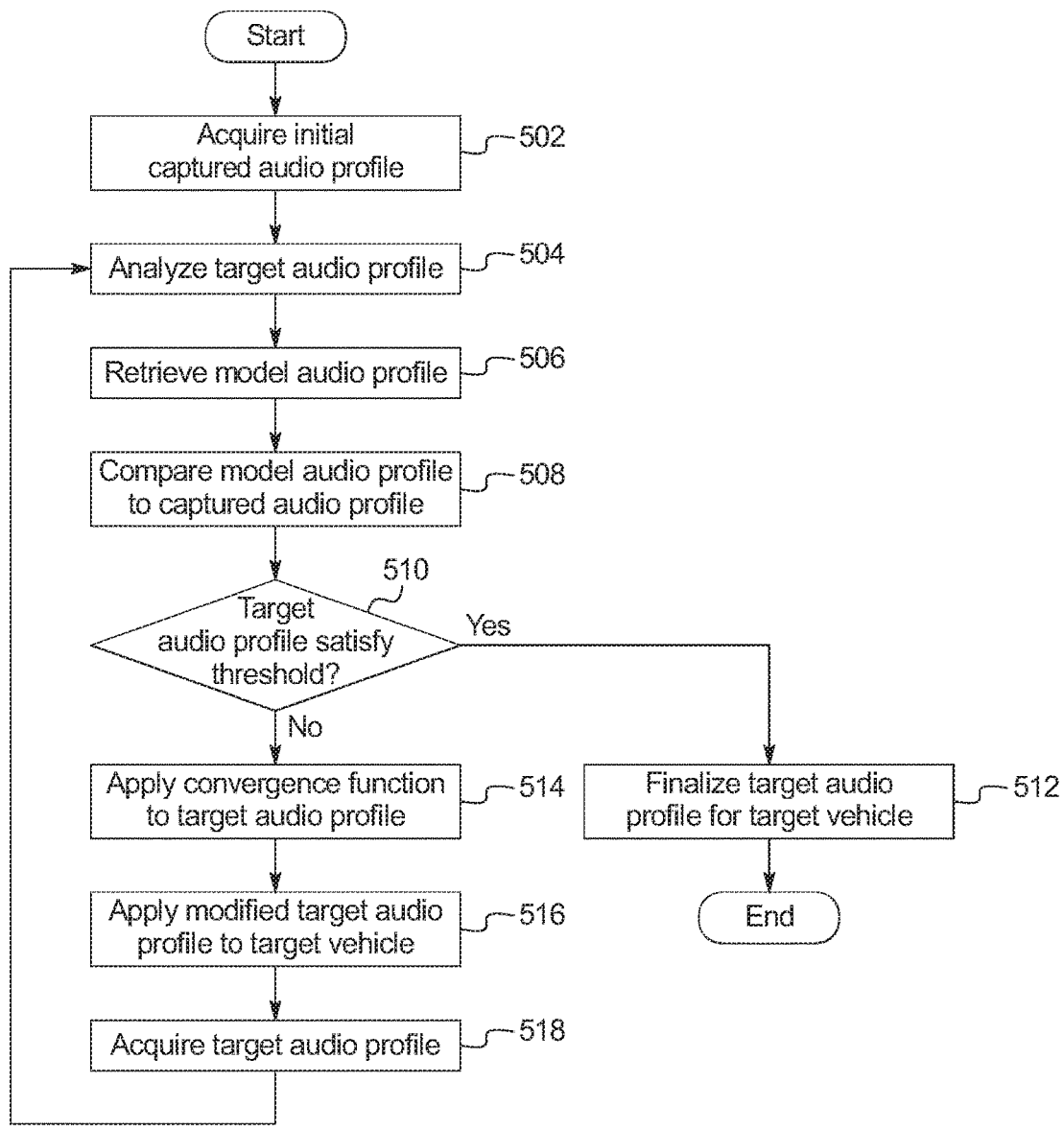
FIG. 5 is a flowchart depicting an example method to tune a electronic sound enhancement system that may be implemented by the electronic components of FIG. 4

FIG. 5 is a flowchart depicting an example method to tune a electronic sound enhancement system of the target vehicle 102 that may be implemented by the electronic components 400 of FIG. 4. Initially, the audio capturer 202 acquires an initial captured audio profile 110 from the target vehicle 102 (block 502). In some examples, the audio capturer 202 acquires the captured audio profile 110 using the audio capture device 130 positioned in the target vehicle 102 to capture audio from the perspective of the driver. The audio analyzer 204 analyzes the captured audio profile 110 to identify the power values associated with RPM value-frequency order pairs and generates the analyzed audio profile 212 of FIG. 2 (block 504). The audio tuner 206 retrieves the model audio profile from the audio profile database 122 (block 506). The audio tuner 206 compares the power values associated with RPM value-frequency order pairs of the analyzed audio profile 212 to the corresponding power values associated with RPM value-frequency order pairs of the model audio profile (block 508).

The audio tuner 206 determines whether the analyzed audio profile 212 satisfies a similarity threshold (block 510). The analyzed audio profile 212 satisfies the similarity threshold when a percentage of the power levels in each of the frequency orders satisfy the tolerance value when compared to the corresponding power levels in the model audio profile. If the analyzed audio profile 212 satisfies the similarity threshold, the audio tuner 206 finalizes the target audio profile 108 for the target vehicle 102 (block 512). The method of FIG. 5 then ends.

If the analyzed audio profile 212 does not satisfy the similarity threshold, the audio tuner 206 applies the convergence function (e.g., one of the convergence functions 302 and 304 of FIG. 3) to the analyzed audio profile 212 to generate the converged audio profile 216 (block 514). The audio flasher 208 generates the target audio profile 108 based on the converged audio profile 216 and applies (e.g., downloads) the target audio profile 108 to the ESE sound board 122 of the target vehicle 102 (block 516). The audio capturer 202 then reacquires the captured audio profile 110 from the target vehicle 102 (block 518).

The flowchart of FIG. 5 is representative of machine readable instructions that comprise one or more programs that, when executed by a processor (such as the processor 402 of FIG. 4), implement the audio profile tuner 128 of FIGS. 1 and/or 2. Further, although the example programs are described with reference to the flowchart illustrated in FIG. 5, many other methods of implementing the example audio capturer 202, the example audio analyzer 204, the example audio tuner 206, the example audio flasher 208 and/or, more generally, the example audio profile tuner 128 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method of enhancing sound in a vehicle, the method comprising:
    sampling, with a microphone, an audio profile of vehicle noises in a cabin of the vehicle;
    comparing, with a processor, the sampled audio profile to a model audio profile; and
    when the sampled audio profile does not satisfy a similarity threshold, applying, with the processor, a convergence function to specify an audio signal to play on speakers of the vehicle.

2. The method of claim 1, wherein the audio profile is a first audio profile, and the method including, when the sampled audio profile does not satisfy the similarity threshold:
    playing the audio signal on the speakers of the vehicle; and
    sampling, with the microphone, a second audio profile of the vehicle noises in the cabin of the vehicle, the vehicle using the audio signal to enhance the vehicle noises.

3. The method of claim 1, wherein the audio signal to play on the speakers of the vehicle is specified based on revolutions per minute of an engine of the vehicle.

4. The method of claim 1, wherein sampling the audio profile of the vehicle noises in the cabin of the vehicle includes driving the vehicle so that an engine of the vehicle cycles from a minimum revolutions per minute to a maximum revolutions per minute.

5. The method of claim 1, wherein the convergence function is based on differences between the sampled audio profile and the model audio profile.

6. The method of claim 5, wherein the convergence function adjusts the sampled audio profile by values greater than the differences between the sampled audio profile and the model audio profile.

7. An apparatus to enhance sound in a vehicle, the apparatus comprising:
    an audio capturer configured to sample, with a microphone, an audio profile of vehicle noises in a cabin of the vehicle; and
    an audio tuner configured to:
    compare the sampled audio profile to a model audio profile; and
    when the sampled audio profile does not satisfy a similarity threshold, applying, with the a processor, a convergence function to the sampled audio profile to specify an audio signal to play on speakers of the vehicle.

8. The apparatus of claim 7, wherein the audio profile is a first audio profile, wherein the apparatus includes an audio flasher and wherein, when the sampled audio profile does not satisfy the similarity threshold the audio capturer is configured to sample, with the microphone, a second audio profile of the vehicle noises in the cabin of the vehicle, the vehicle using the audio signal to enhance the vehicle noises.

9. The apparatus of claim 7, wherein the audio signal to play on the speakers of the vehicle is based on revolutions per minute of an engine of the vehicle.

10. The apparatus of claim 7, wherein to sample the audio profile of the vehicle noises in the cabin of the vehicle, the vehicle is configured to drive so that an engine of the vehicle cycles from a minimum revolutions per minute to a maximum revolutions per minute.

11. The apparatus of claim 7, wherein the convergence function is based on differences between the sampled audio profile and the model audio profile.

12. The apparatus of claim 11, wherein the convergence function adjusts the sampled audio profile by values greater than the differences between the sampled audio profile and the model audio profile.

13. A non-transitory computer readable medium comprising instructions that, when executed, cause a machine to:
sample, with a microphone, an audio profile of vehicle noises in a cabin of a vehicle;
compare the sampled audio profile to a model audio profile; and
when the sampled audio profile does not satisfy a similarity threshold, apply a convergence function to the sampled audio profile to specify an audio signal to play on speakers of the vehicle.

14. The non-transitory computer readable medium of claim 13, wherein the audio profile is a first audio profile, and wherein the instructions cause the machine to, when the sampled audio profile does not satisfy the similarity threshold:
download the audio signal to the vehicle; and
sample, with the microphone, a second audio profile of the vehicle noises in the cabin of the vehicle, the vehicle using the audio signal to enhance the vehicle noises.

15. The non-transitory computer readable medium of claim 13, wherein the audio signal to play on the speakers of the vehicle is based on revolutions per minute of an engine of the vehicle.

16. The non-transitory computer readable medium of claim 13, wherein the convergence function is based on differences between the sampled audio profile and the model audio profile.

17. The non-transitory computer readable medium of claim 16, wherein the convergence function adjusts the sampled audio profile by values greater than the differences between the sampled audio profile and the model audio profile.

* * * * *